UNITED STATES PATENT OFFICE.

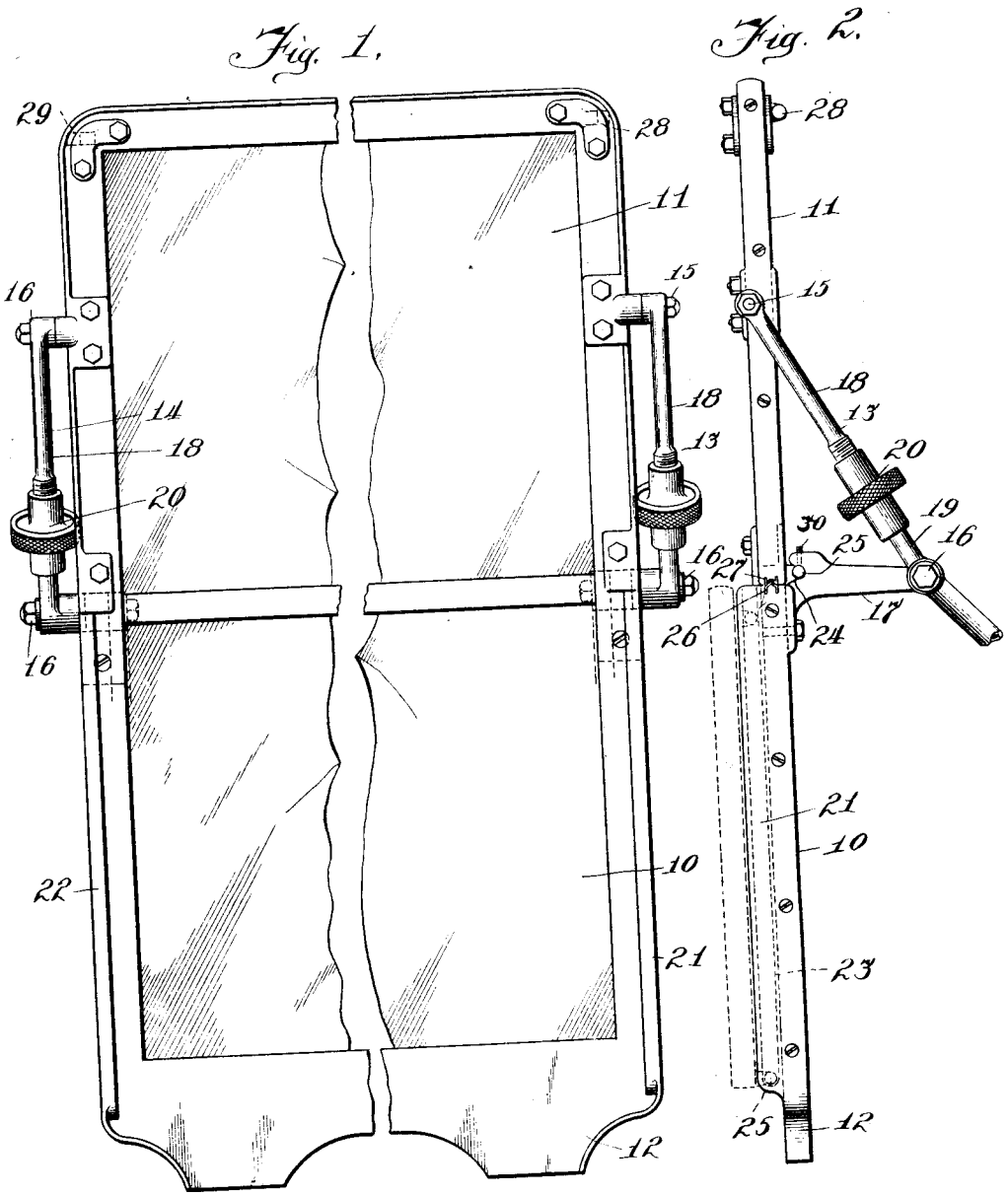

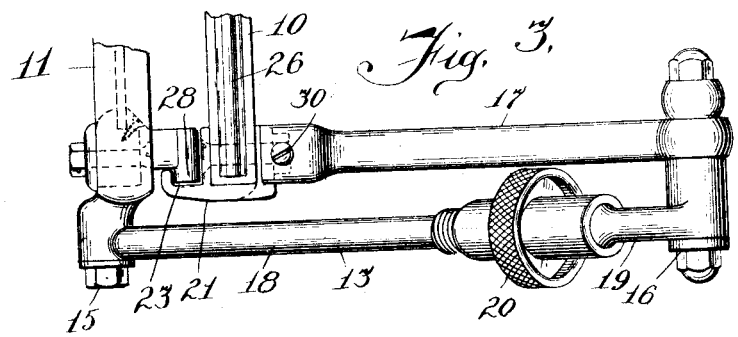
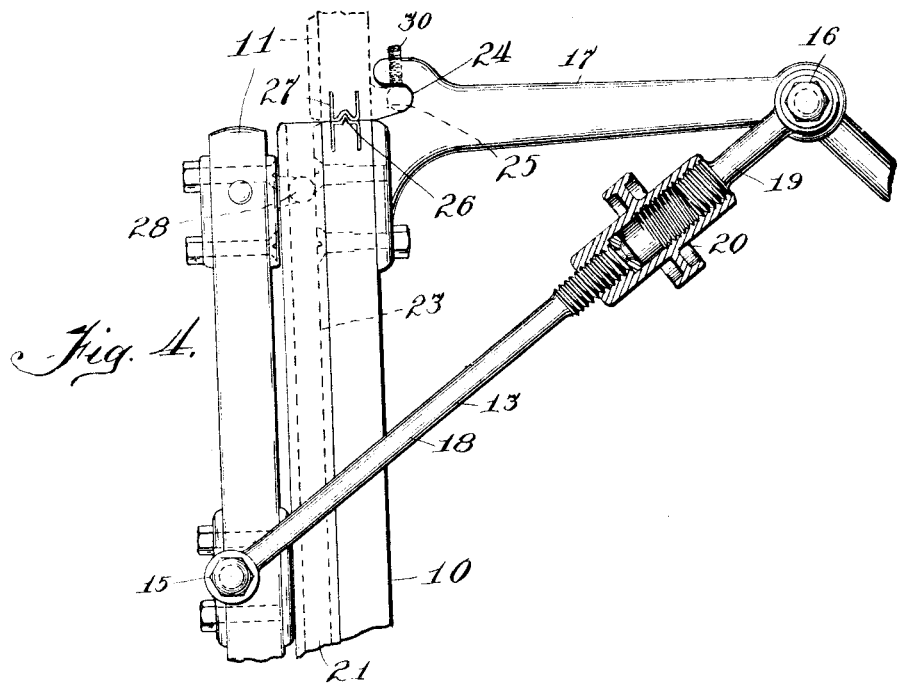

HARRY A. DOUGLAS, OF CHICAGO, ILLINOIS, ASSIGNOR TO THE ADAMS & WESTLAKE COMPANY, A CORPORATION OF ILLINOIS.

WIND-SHIELD 1,037,604.     Specification of Letters Patent.     Patented Sept. 3, 1912.

Application filed November 22, 1909. Serial No. 529,318.

*To all whom it may concern:*

Be it known that I, HARRY A. DOUGLAS, a citizen of the United States, and resident of Chicago, county of Cook, and State of Illinois, have invented certain new and useful Improvements in Wind-Shields, of which the following is a specification, and which are illustrated in the accompanying drawings, forming a part thereof.

The invention relates to wind shields for vehicles particularly applicable for use in connection with automobiles, and comprising a pair of glazed sections, one of which is fixedly mounted upon the dashboard of the vehicle; the other, when in position for service, is mounted upon the fixed section and when out of service is brought alongside thereof.

The object of the invention is to provide improved means for securing the two sections of the shield together and for locking the movable section in both of its positions; the invention consisting in a structure such as is hereinafter described and as illustrated in the accompanying drawings, in which—

Figure 1 is a rear elevation of the shield; Fig. 2 is a side elevation thereof, the movable section being shown in solid lines in position for service and in dotted lines in its retracted position; Fig. 3 is a detail plan section above the locking mechanism and showing the movable section out of service; and Fig. 4 is a detail side elevation, partly in section, the movable section being shown in solid lines out of service.

The two sections of the shield are generally designated by the numerals 10 and 11, the lower section 10 being provided with a base plate 12, adapted to fit upon and be secured to the dashboard of the vehicle; the upper section or plate 11 being movable to an upper or service position, in which it rests upon and is in alinement with the lower section, and to a lower or storage position in which it is located immediately back of and substantially parallel with the lower section. The two sections are hinged together by means of a pair of extensible arms 13, 14, such arms being attached to the movable section at its side edges and intermediate of its top and bottom, as shown at 15; and being pivoted at 16 to forwardly-extending bracket-arms 17, only one of which is plainly shown. The hinge and locking mechanism being duplicated, but one set need be described in detail. Each of the extensible arms, as 13, comprises a pair of members 18, 19, united by means of a turn-buckle 20. The pivots 15, 16, project laterally beyond the edges of the shield sections 10, 11, to permit the arms 13, 14, to swing as the upper section is shifted. Plates 21, 22, are attached to the side edges of the lower section 10 and extend backwardly therefrom, the inner face of such extension being channeled, as shown at 23, such channel being open at the top and closed at the bottom and extending preferably, although not necessarily, the entire length of the plate. The inner end of the bracket 17 extends above the lower shield section 10, and is notched or recessed, as shown at 24. A stud 25, attached to the lower corner of the upper shield section 11, engages the recess 24 when the upper section is in the service position, and the channel 23 when this section is lowered. When the movable section 11 is brought to service position it rests upon the upper edge of the lower section. The arms 13, 14, being extended tend to tilt the upper section backwardly, forcing the stud 25 against the upper wall of the recess 24, and pressing the upper shield section downwardly upon the lower section. Preferably the two sections are matched together, as by the use of a pair of plates 26, 27, fixed to the upper edge of one and the lower edge of the other, one of such plates being grooved and the other having a complementary rib. These matched sections together more certainly prevents rattling and also effectually excludes the weather.

Studs 28, 29, are secured to the upper corners of the shield section 11 and enter the channels 23 when this section is moved to its lower position. When the section is in this position the extension of the arms 13, 14, forces the studs 25 to the bottoms of the channels 23 and tends to tilt the top of the section backwardly, binding the studs 28, 29, against the rearward walls of the channels, effectually preventing rattling. The section 11 may be moved from either of its positions by releasing the turn-buckles 20, slightly shortening the arms 13, 14.

The channels 23 are preferably continuous throughout the entire length of the plates 21, 22, in order that they may guide the studs 25. The two ends only, however, of the channels are sufficient in securing the shield section, and the intermediate portions of the plates 21, 22, may, if desired, be dispensed with.

Preferably an adjusting screw 30 is set through the shoulder of the bracket 17, entering the recess 24 and forming the bearing for the stud 25, providing means for adjusting the parts so that the upper section shall be exactly vertical when securely locked.

I claim as my invention—

1. A wind shield for vehicles comprising, in combination, a fixed section and a movable section, brackets extending forwardly from the upper corners of the fixed section, extensible arms pivotally attached to the brackets and to the movable shield section, and a detent on the movable section engageable with the bracket for holding the movable section against backward movement when such section is vertical, and means for forcibly extending the arms to urge the movable section backwardly.

2. In a wind shield for vehicles, in combination, a fixed section and a movable section, brackets extending forwardly from the top of the fixed section and having upstanding recessed shoulders at their inner ends, extensible arms pivotally attached to the brackets and to the movable section, means for forcibly extending the arms, and studs mounted upon the movable section and engageable with the recesses of the bracket shoulders.

3. In a wind shield for vehicles, in combination, a fixed section and a movable section, brackets extending forwardly from the top of the fixed section and having upstanding recessed shoulders at their inner ends, extensible arms pivotally attached to the brackets and to the movable section, means for forcibly extending the arms, studs mounted upon the movable section and engageable with the recesses of the bracket shoulders, and plates extending backwardly from the side edges of the fixed shield section and being channeled to receive the studs.

4. In a wind shield for vehicles, in combination, a fixed section and a movable section, brackets extending forwardly from the fixed section adjacent its upper end and having at their inner ends upstanding recessed shoulders, channeled plates extending backwardly from the side edges of the fixed section, studs secured to the movable section at the tops and bottoms of the sides thereof and being engageable with the channels of the plates, the lower pair of such studs being engageable with the recesses of the brackets, extensible arms pivotally attached to the brackets and to the movable section, and means for forcibly extending the arms.

5. In a wind shield for vehicles, in combination, a fixed section and a movable section, brackets extending forwardly from the fixed section, interlocking means for engaging the lower edge of the movable section with the upper edge of the fixed section, and arms pivotally attached to the brackets and to the movable section, each of such arms comprising two sections united by a turnbuckle.

6. A wind shield for vehicles comprising, in combination, a fixed section and a movable section, brackets extending forwardly from the upper corners of the fixed section, extensible arms pivotally attached to the brackets and to the movable shield section, means for forcibly extending the arms, and an adjustable detent on the movable section engageable with the bracket for holding the movable section against pressure due to the extension of the arms.

7. In a wind shield for vehicles, in combination, a fixed section and a movable section, brackets extending forwardly from the top of the fixed section and having upstanding recessed shoulders at their inner ends, extensible arms pivotally attached to the brackets and to the movable section, means for forcibly extending the arms, studs mounted upon the movable section and engageable with the recesses of the bracket shoulders, and adjusting screws set through the shoulders of the brackets and entering the recesses thereof.

8. In a wind shield, in combination, a movable plate, a support for the lower edge of the plate, means for interlocking the plate with the support, brackets extending forwardly from the support, and arms pivotally attached to the brackets and to the movable plate, each of such arms comprising two sections united by a turn buckle.

9. A wind shield for vehicles comprising, in combination, a pair of sections, one thereof being adapted to be secured to the dashboard of a vehicle and the other being movable into alinement with the first, brackets extending forwardly from the upper corners of the first-named section, extensible arms pivotally attached to the brackets and to the second-named section, means for forcibly extending the arms, and a detent on the movable section engageable with the bracket for holding the second-named section against pressure due to the extension of the arms.

HARRY A. DOUGLAS.

Witnesses:
Louis K. Gillson,
E. M. Klatcher.